(12) United States Patent
Lee et al.

(10) Patent No.: US 6,924,917 B2
(45) Date of Patent: Aug. 2, 2005

(54) COLOR FILTER SUBSTRATE AND METHOD OF FABRICATING THE SAME

(75) Inventors: Yun-Bok Lee, Seoul (KR); Jong-Hoon Yi, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/640,372

(22) Filed: Aug. 14, 2003

(65) Prior Publication Data

US 2004/0046177 A1 Mar. 11, 2004

Related U.S. Application Data

(62) Division of application No. 10/254,767, filed on Sep. 26, 2002, now abandoned.

(30) Foreign Application Priority Data

Sep. 28, 2001 (KR) .......................................... 2001-60618

(51) Int. Cl.[7] .............................. E06B 7/28; G03F 9/00; C09K 19/00
(52) U.S. Cl. ........................ 359/248; 359/247; 359/245; 430/7; 430/20
(58) Field of Search .............................. 430/7, 20, 200, 430/201, 321; 359/248, 247, 246, 245, 240, 238

(56) References Cited

U.S. PATENT DOCUMENTS

| 4,640,583 | A | * | 2/1987 | Hoshikawa et al. ......... 349/153 |
| 5,283,600 | A | | 2/1994 | Imai ............................. 353/34 |
| 5,521,035 | A | * | 5/1996 | Wolk et al. .................... 430/20 |
| 5,552,192 | A | * | 9/1996 | Kashiwazaki et al. ...... 427/492 |
| 5,576,265 | A | * | 11/1996 | DeBoer et al. .............. 503/227 |
| 5,792,579 | A | * | 8/1998 | Phillips .......................... 430/7 |
| 5,798,744 | A | * | 8/1998 | Tanaka et al. ................. 345/92 |
| 5,916,714 | A | * | 6/1999 | Sato et al. ...................... 430/7 |
| 2002/0054259 | A1 | * | 5/2002 | Funahata et al. ............ 349/113 |
| 2004/0080697 | A1 | * | 4/2004 | Song et al. .................. 349/130 |

FOREIGN PATENT DOCUMENTS

| JP | 61-46902 | 3/1986 |
| JP | 3-12632 | 1/1991 |
| JP | 11-337723 | 12/1999 |
| JP | 2000-56122 | 2/2000 |

* cited by examiner

*Primary Examiner*—Timothy Thompson
(74) *Attorney, Agent, or Firm*—Morgan, Lewis & Bockius LLP

(57) ABSTRACT

A color filter substrate for a liquid crystal display device includes a polarizing substrate, a black matrix positioned on the polarizing substrate, a color filter layer positioned on the black matrix, and a common electrode positioned on the color filter layer.

14 Claims, 6 Drawing Sheets

COLOR FILTER SUBSTRATE AND METHOD OF FABRICATING THE SAME

This is a divisional of application Ser. No. 10/254,767 filed on Sep. 26, 2002 now abandoned. The present invention claims the benefit of Korean Patent Application No. P2001-060618 filed in Korea on Sep. 28, 2001, which is hereby incorporated by reference.

BACKGROUND OF THE INVENTION

1. Field of the Invention

The present invention relates to a liquid crystal display device substrate, and more particularly, to a color filter substrate and method of fabricating a color filter substrate for a liquid crystal display device.

2. Discussion of the Related Art

In general, a liquid crystal display (LCD) device includes upper and lower substrates with a liquid crystal material layer disposed therebetween. One of the upper or lower substrates commonly includes a color filter layer for displaying color images. The color filter layer may commonly include sub-color filters of red (R), green (G), and blue (B). The color filter layer is formed by various methods including a dyeing method, an electro-deposition method, a pigment dispersion method, and a printing method, for example. In general, the pigment dispersion method is commonly used because it forms a fine pattern.

FIG. 1 is a cross-sectional view of a liquid crystal display device according to the related art. In FIG. 1, the LCD device includes first and second substrates 31 and 11, which are spaced apart and face each other, a liquid crystal material layer 50 is interposed between the first and second substrates 31 and 11, and a thin film transistor "T" is formed on the inner surface of the first substrate 31. A pixel electrode 32 of a transparent conducting material is formed on the first substrate 31, and the pixel electrode 32 is disposed at a pixel region "P." The pixel electrode 32 is connected to the thin film transistor "T," which functions as a switching device for transmitting signals to the pixel electrode 32. A first alignment layer 34 covers the thin film transistor "T" and the pixel electrode 32. Although not shown, the thin film transistor "T" includes a gate electrode connected to a scanning line, an active layer formed on the gate electrode, and source and drain electrodes separated apart from each other on the active layer, wherein a portion of the active layer exposed between the source and drain electrodes forms a channel of the thin film transistor.

In FIG. 1, a black matrix 12 is formed on the inner surface of the second substrate 11, and a color filter 14 is formed on the black matrix 12. The color filter 14 includes the three sub-color filters of red (R), green (G), and blue (B) disposed in the pixel region "P" and overlaps the black matrix 12. A common electrode 18 made of a transparent conducting material is formed on the color filter 14, and a second alignment layer 20 is formed on the common electrode 18. The liquid crystal material layer 50 is disposed between the first alignment layer 34 and the second alignment layer 20, wherein preliminary alignment of liquid crystal molecules of the liquid crystal material layer 50 is dependent upon characteristics of the alignment layers 34 and 20. Then, first and second polarization films 36 and 22 are arranged outer surfaces of the first and second substrates 31 and 11, respectively, wherein transmission axes of the first and second polarization films 36 and 22 are perpendicular to each other.

FIGS. 2A to 2D are cross-sectional views of a fabrication method for a color filter substrate of the liquid crystal display device of FIG. 1 according to the related art. In FIG. 2A, the black matrix 12 is formed on the second transparent substrate 11, wherein the black matrix 12 has an opening corresponding to the pixel region "P." The second transparent substrate 11 may be made of glass, and the black matrix 12 may be made of an inorganic material such as chromium (Cr), Cr/CrOx, or an organic material that includes carbon. Here, the black matrix 12 material includes an inorganic material such as chromium and is formed by a sputtering method under vacuum conditions, whereby the manufacturing process is complicated and expensive. Conversely, forming the black matrix 12 of the organic material is advantageous due to the relatively short manufacturing process, low cost, and high visibility. Accordingly, the organic material is commonly selected for the black matrix 12.

In FIG. 2B, the color filter layer 14 is formed within the pixel region "P" on the second transparent substrate 11 having the black matrix 12. The color filter layer 14 overlaps the black matrix 12, and includes three sub-color filters 14a, 14b, and 14c of red, green, and blue, respectively, and each of the sub-color filters correspond to each of the pixel regions "P." The color filter layer 14 may be formed by the pigment dispersion method, which includes steps of coating a photosensitive color resin on a substrate, exposing the color resin to a light, and developing the color resin.

In FIG. 2C, the common electrode 18 and the alignment layer 20 are subsequently formed on the color filter layer 14. The common electrode 18 is formed of a transparent conducting material, and the alignment layer 20 is formed of polyimide. Thus, a color filter substrate is completed.

In FIG. 2D, the polarization film 22 is formed on the outer side of the color filter substrate. Although not shown, the polarization film 22 is formed after forming a liquid crystal cell by aligning and attaching the color filter substrate and an array substrate. The array substrate is fabricated by processes of deposition and patterning a thin film using several masks; injecting liquid crystal materials; and sealing.

In the fabrication method of FIGS. 2A to 2D, as the color filter substrate is fabricated using a photolithographic process, the second transparent substrate 11 is chemically processed. Accordingly, the second transparent substrate 11 must be formed of specific materials that are chemically resistant. In addition, an overcoat layer (not shown) may be formed on the color filter layer 14 to flatten an inner surface of the second transparent substrate 11. Accordingly, a total number of manufacturing processes is increased,. thereby increasing manufacturing costs.

SUMMARY OF THE INVENTION

Accordingly, the present invention is directed to a color filter substrate for a liquid crystal display device and a manufacturing method of the color filter substrate that substantially obviates one or more of problems due to limitations and disadvantages of the related art.

An object of the present invention is to provide a color filter substrate and a method of manufacturing a color filter substrate that reduces a total number of manufacturing processes and reduces manufacturing costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color filter substrate for a liquid crystal display device includes a polarizing substrate, a black matrix positioned on the polarizing substrate, a color filter layer positioned on the black matrix, and a common electrode positioned on the color filter layer.

In another aspect, a method of fabricating a color filter substrate for a liquid crystal display device includes steps of forming a black matrix on a polarizing substrate, forming a color filter layer on the black matrix, and forming a common electrode on the color filter layer.

In another aspect, a method of fabricating a color filter substrate for a liquid crystal display device includes steps of aligning a first transcription film having a black resin layer, a first light-to-heat conversion layer, and a first supporting film, sequentially formed onto a polarizing substrate, selectively performing a first thermal transfer process on a first portion of the first transcription film, removing the first transcription film except for the first portion where the first thermal transfer process is performed, thereby forming a black matrix on the polarizing substrate, aligning a second transcription film having a color filter layer, a second light-to-heat conversion layer, and a second supporting film, sequentially formed onto the polarizing substrate including the black matrix, selectively performing a second thermal transfer process on a first portion of the second transcription film, removing the second transcription film except for the first portion of the second transcription film where the second thermal transfer process is performed, thereby forming a color filter on the polarizing substrate including the black matrix, and forming a common electrode on the color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, which is illustrated in the accompanying drawings.

Figure 1:
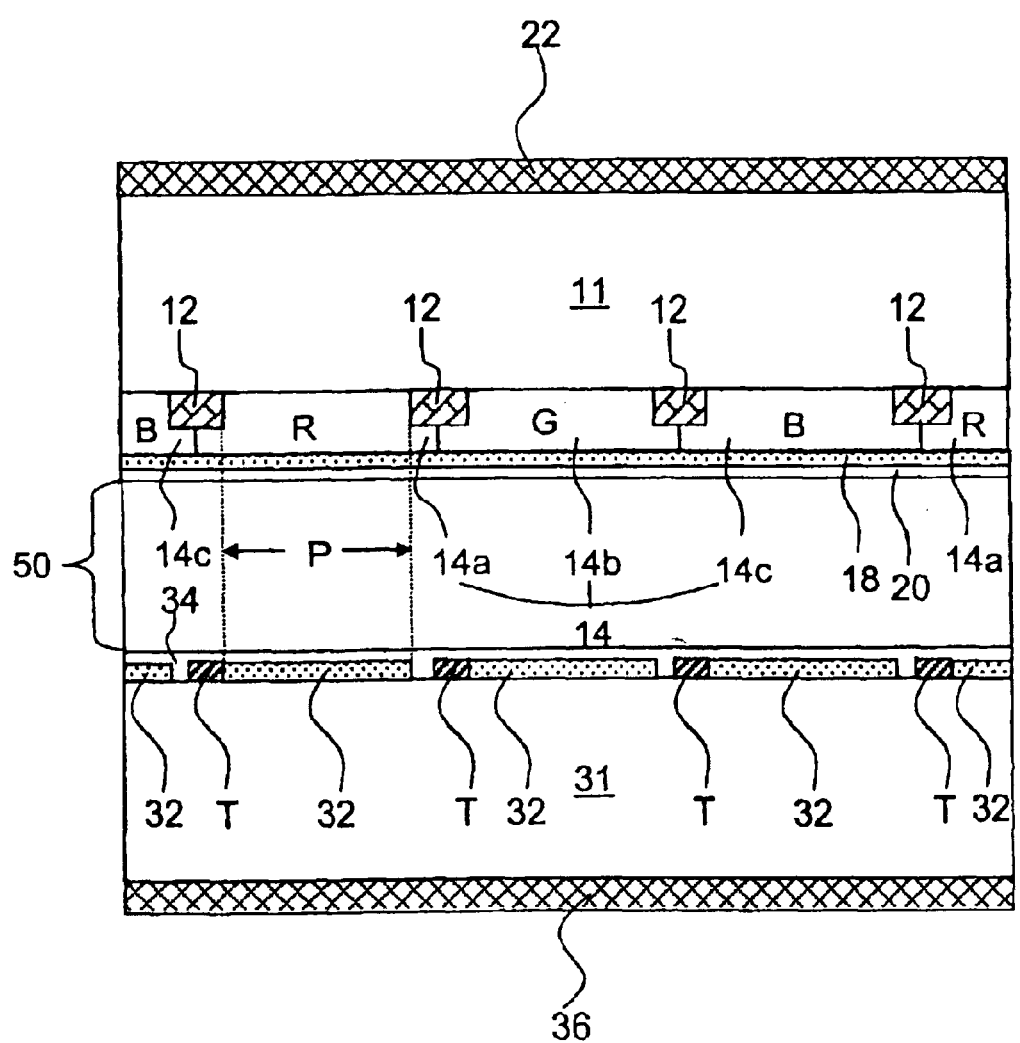
FIG. 1 is a cross-sectional view of a liquid crystal display device according to the related art.
Figure 2A:
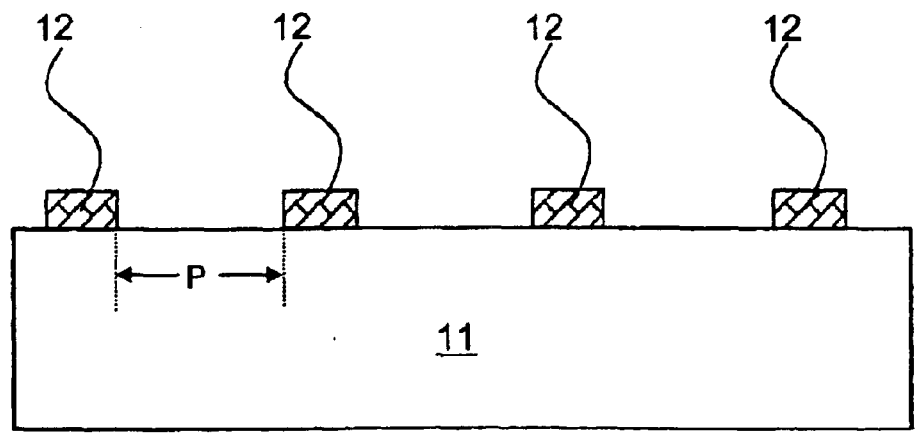
FIGS. 2A to 2D are cross-sectional views of a fabrication method for a color filter substrate of the liquid crystal display device of FIG. 1 according to the related art.
Figure 2B:
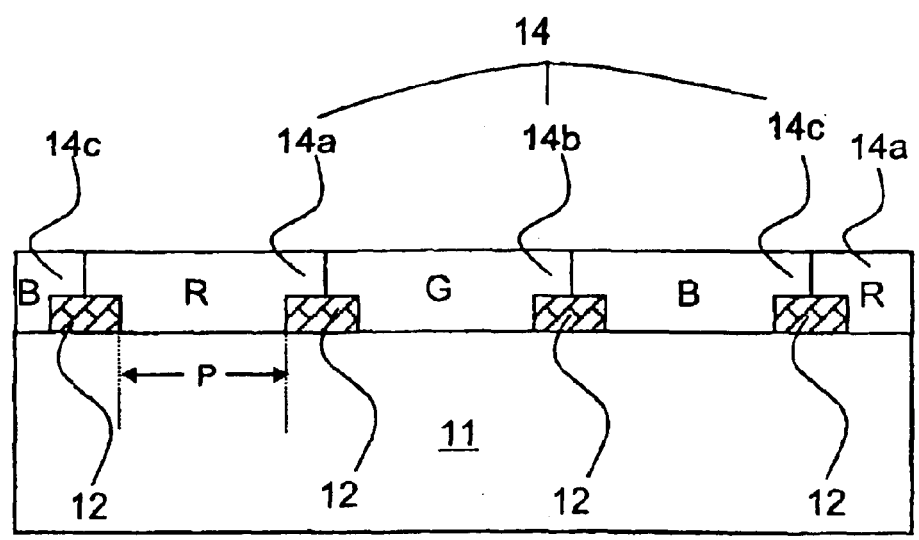
Figure 2C:
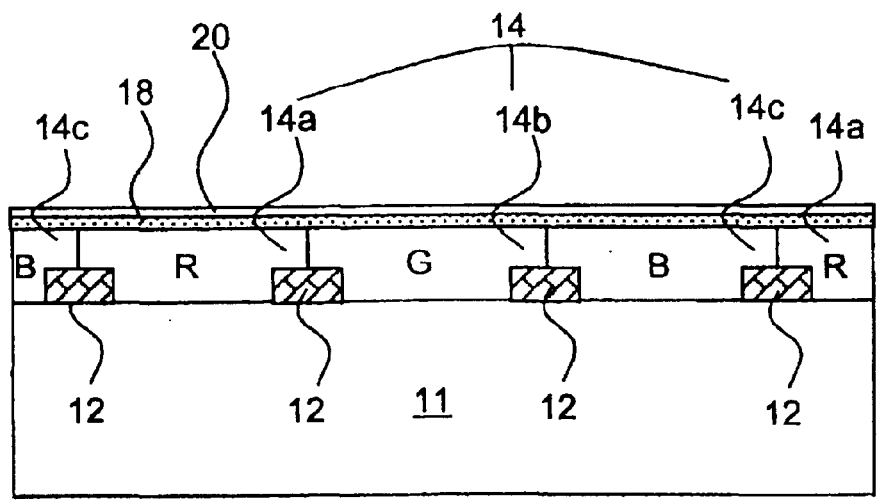
Figure 2D:
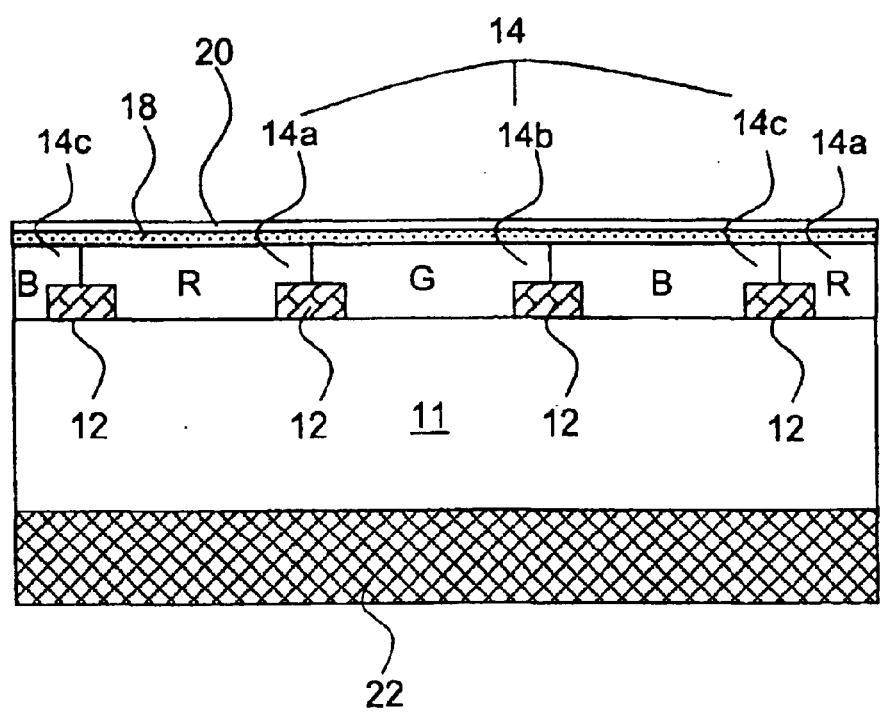
Figure 3:
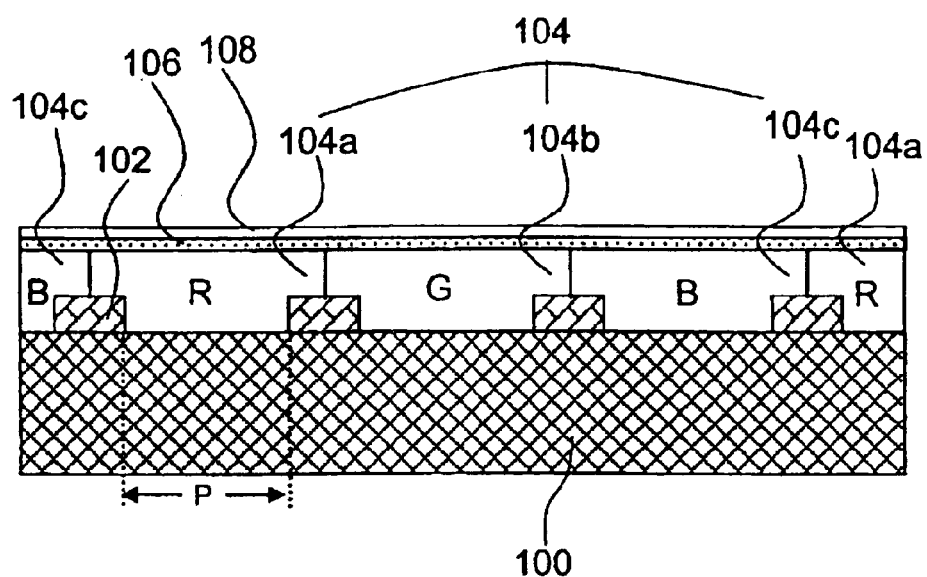
FIG. 3 is a cross-sectional view of an exemplary color filter substrate for a liquid crystal display device according to the present invention.

FIG. 3 is a cross-sectional view of an exemplary color filter substrate for a liquid crystal display device according to the present invention. In FIG. 3, the exemplary color filter substrate may include a polarizing substrate 100 having a pixel region "P." The polarizing substrate 100 may function both as a substrate to support elements and as a polarizer. A black matrix 102 may be formed on the polarizing substrate 100, and the black matrix 102 may include an opening corresponding to the pixel region "P." A color filter layer 104 may be formed on the black matrix 102 to overlap the black matrix 102. The color filter layer 104 may include three sub-color filters 104a, 104b, and 104c of red (R), green (G), and blue (B), respectively, wherein each of the sub-color filters 104a, 104b, and 104c may correspond to each of the pixel regions "P." The color filter layer 104 may include a substantially flat surface. A common electrode 106 made of a transparent conducting material may be formed on the color filter layer 104, and an alignment layer 108 may be formed on the common electrode 106.

In addition, the color filter layer 104 may be formed using a thermal transfer method, which may be commonly referred to as a thermal imaging method. During the thermal transfer method, a laser beam may be irradiated onto a transcription film, thereby transferring a pattern onto a substrate. Accordingly, in the thermal transfer method, since manufacturing steps of coating and developing are not necessary, a total number of manufacturing processes is decreased as compared to a pigment dispersed method.

Figure 4:
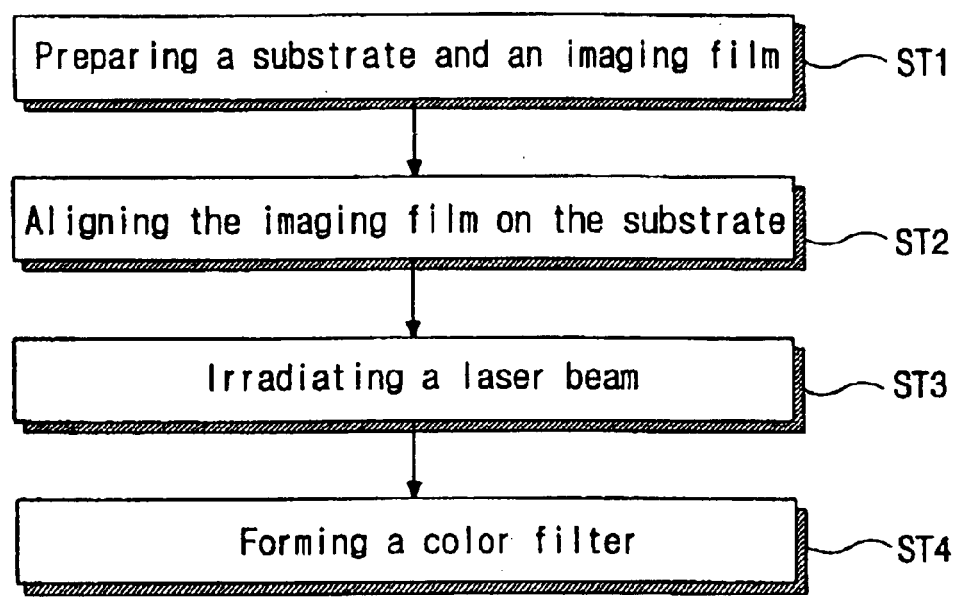
FIG. 4 is a flow chart of an exemplary process for fabricating a color filter substrate according to the present invention.

FIG. 4 is a flow chart of an exemplary process for fabricating a color filter substrate according to the present invention. In FIG. 4, a first step ST1 may include preparation of a substrate and a transcription film. According to the present invention, the substrate of step ST1 may include the polarizing substrate of FIG. 3. The transcription film may include a color filter layer, a light-to-heat conversion (LTHC) layer, and a supporting film. The LTHC layer may be made of a material that emits heat by application of energy from a laser beam, for example, and may be disposed between the color filter layer and the supporting film.

In a second step ST2, the transcription film may be aligned on the substrate. Accordingly, the color filter layer of the transcription film may contact the substrate. In addition, an adhesive layer may be formed between the color filter layer and the substrate. The adhesive layer may be formed on the substrate or on the color filter layer of the transcription film.

In a third step ST3, a laser beam may be irradiated onto the aligned transcription film on the substrate. Then, the color filter layer may be exposed to a laser beam and transferred to the substrate by the LTHC layer.

In step ST4, the LTHC layer and the supporting film may be removed from the transcription film, whereby a color filter layer may remain on the substrate. In addition, by repeating the first ST1, second ST2, third ST3, and fourth ST4 steps, a color filter layer including sub-color filters red, green, and blue may be formed on the substrate.

Figure 5A:
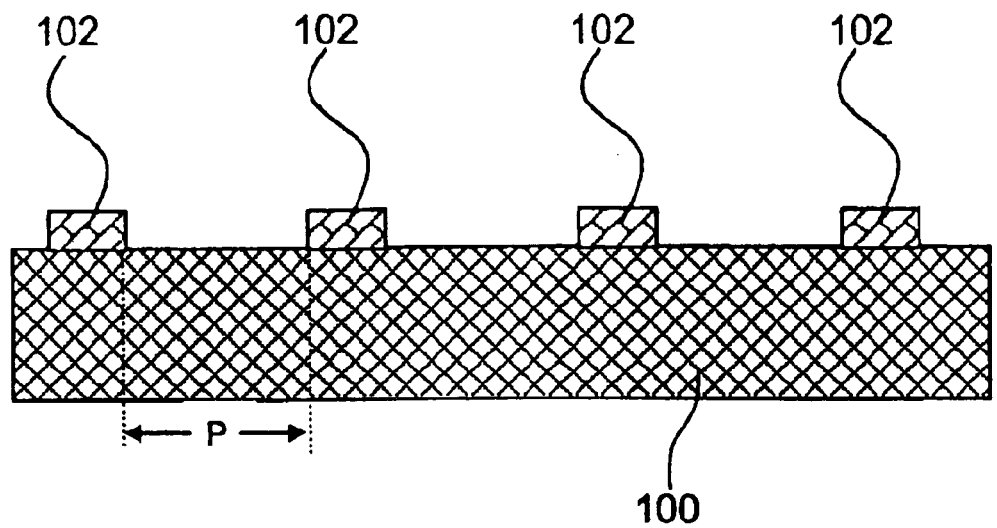
FIGS. 5A to 5D are cross-sectional views of an exemplary method for fabricating a color filter substrate according to the present invention.

FIGS. 5A to 5D are cross-sectional views of an exemplary method for fabricating a color filter substrate according to the present invention. In FIG. 5A, a black matrix 102 may be formed on a polarizing substrate 100. The black matrix 102 may be formed by a thermal transfer method as described above in FIG. 4, in which a transcription film including a black resin layer may be used. The black matrix 102 may include an opening corresponding to a pixel region "P." A first thermal transfer method of forming the black matrix 102 may use a transcription film, which has a black resin layer in place of the color filter layer of FIG. 4 and the black resin layer may include carbon. Accordingly, the polarizing substrate 100 may function as both a substrate and a polarizer, and may include a plastic material such as polyvinyl alcohol (PVA).

Figure 5B:
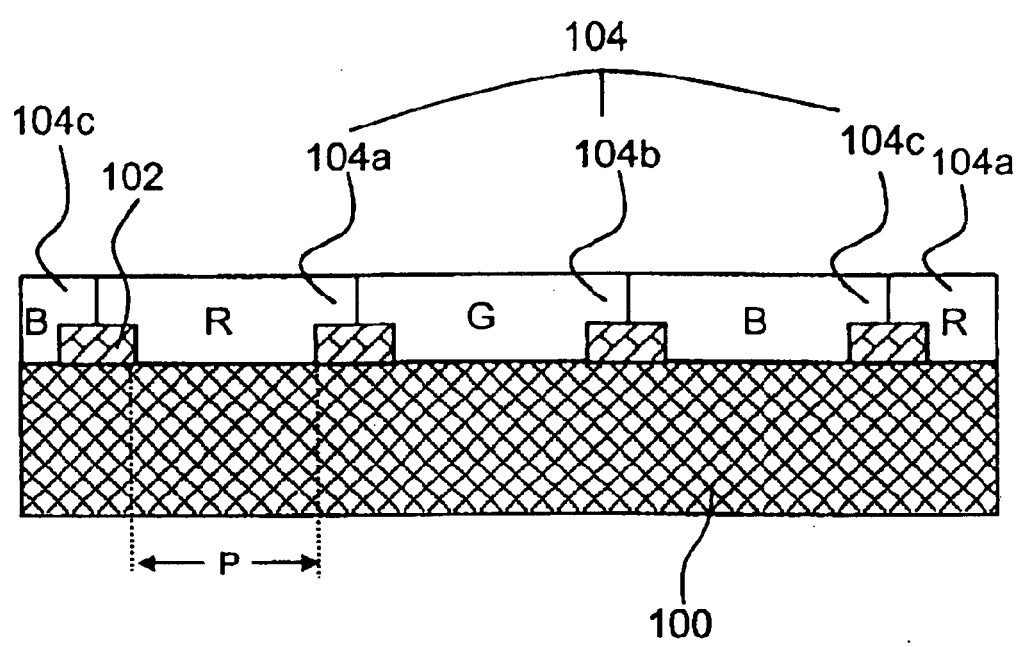

In FIG. 5B, a color filter layer 104 may be formed on the black matrix 102 by the same process shown in FIG. 4. The color filter layer 104 may include three sub-color filters 104a, 104b, and 104c of red, green, and blue, respectively. Accordingly, since the black matrix 102 and the color filter layer 104 are formed by the thermal transfer method, the substrate does not necessarily have to be chemical resistant. Thus, a substrate made of a plastic material, which is cheaper than glass material, may be used. In addition, since the color filter layer 104 may have a substantially flat surface, an overcoat layer may not necessarily be required in order to planarize the surface of the polarizing substrate 100, including the color filter layer 104 and the black matrix 102. Therefore, a total number of manufacturing processes and manufacturing expenses may be reduced.

Figure 5C:
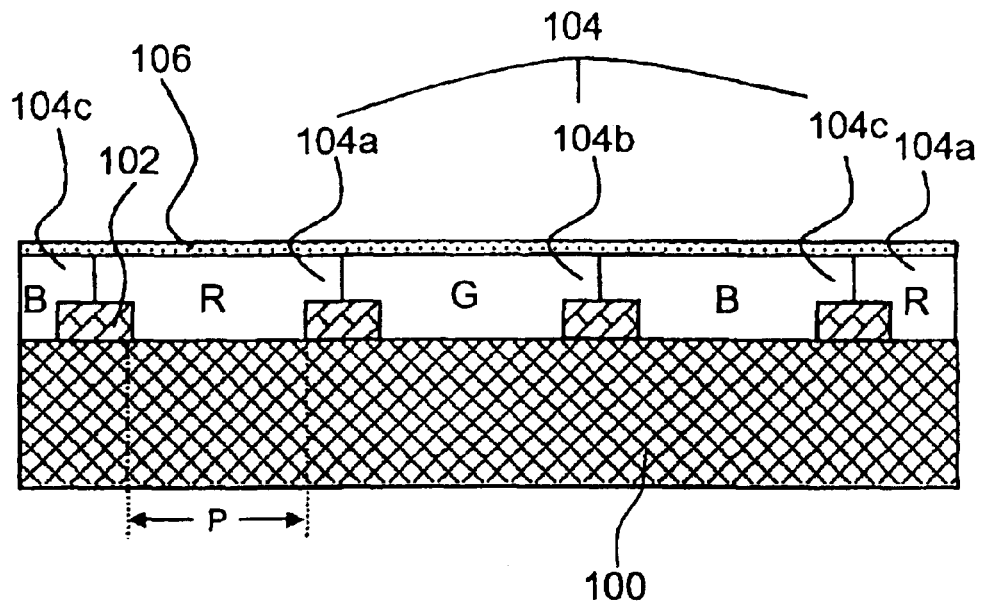

In FIG. 5C, a common electrode 106 may be formed by depositing a transparent conductive material on the color filter layer 104. Then, the transparent conductive material may be patterned. The transparent conductive material may include Indium-Tin-Oxide (ITO) or Indium-Zinc-Oxide (IZO), for example. Alternatively, the transparent conductive material may be selectively formed such that subsequent patterning is unnecessary.

Figure 5D:
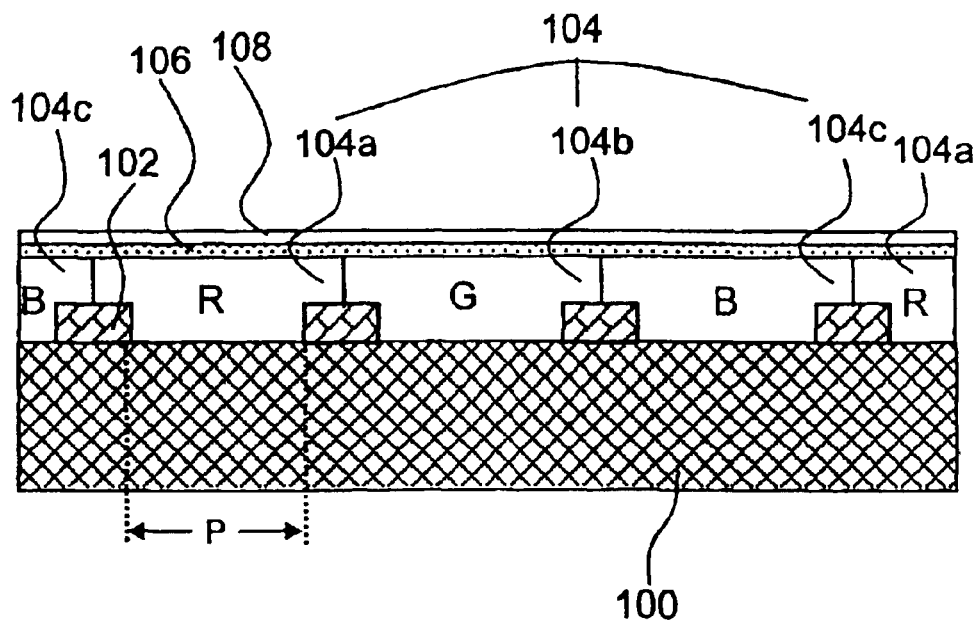

In FIG. 5D, an alignment layer 108 may be formed on the common electrode 106, and may include a high molecular material such as polyimide. The alignment layer 108 may function to control alignment of liquid crystal molecules of a liquid crystal material layer that may be subsequently formed on the alignment layer 108. The alignment of the liquid crystal molecules may be controlled by a rubbing method or a photo-aligning method.

It will be apparent to those skilled in the art that various modifications and variations can be made in the color filter substrate and method of fabricating a color filter substrate of the present invention without departing from the spirit or scope of the invention. Thus, it is intended that the present invention cover the modifications and variations of this invention provided they come within the scope of the appended claims and their equivalents.

What is claimed is:

1. A method of fabricating a color filter substrate for a liquid crystal display device, comprising steps of:

forming a black matrix on a substrate for polarizing light;

forming a color filter layer on the black matrix; and forming a common electrode on the color filter layer, wherein the step of forming a color filter layer includes:
aligning a first transcription film having a first color filter layer, a light-to-heat conversion layer, and a supporting film, sequentially formed on the substrate for polarizing light including the black matrix;

performing a first thermal transfer process on a first portion of the transcription film; and removing the first transcription film except for the first portion where the first thermal transfer process is performed.

2. The method according to claim 1, wherein the step of performing a first thermal transfer process includes irradiating a laser beam onto the first transcription film.

3. A method of fabricating a color filter substrate for a liquid crystal display device, comprising steps of:

forming a black matrix on a polarizing substrate;

forming a color filter layer on the black matrix; and forming a common electrode on the color filter layer,
wherein the step of forming a color filter layer includes:
aligning a first transcription film having a first color filter layer, a light-to-heat conversion layer, and a supporting film, sequentially formed on the polarizing substrate including the black matrix;

performing a first thermal transfer process on a first portion of the transcription film;

removing the first transcription film except for the first portion where the first thermal transfer process is performed;

aligning a second transcription film having a second color filter layer;

performing a second thermal transfer process on a second portion of the second transcription film; and removing the second transcription film except for the second portion where the second thermal transfer process is performed.

4. The method according to claim 3, wherein the step of performing a second thermal transfer process includes irradiating a laser beam onto the second transcription film.

5. The method according to claim 3, further comprising steps of aligning a third transcription film having a third color filter layer, performing a third thermal transfer process on a third portion of the third transcription film, and removing the third transcription film except for the third portion where the third thermal transfer process is performed.

6. The method according to claim 5, wherein the step of performing a third thermal transfer process includes irradiating a laser beam onto the third transcription film.

7. The method according to claim 1, wherein the first transcription film includes an adhesive layer on a side of the first color filter layer facing the substrate for polarizing light.

8. The method according to claim 1, wherein the step of forming a black matrix includes:

aligning a transcription film having a black resin layer, a light-to-heat conversion layer, and a supporting film, sequentially onto the substrate for polarizing light;

selectively performing a thermal transfer process on a first portion of the transcription film; and removing the transcription film except for the first portion where the thermal transfer process is performed.

9. The method according to claim 8, wherein the black resin layer includes carbon.

10. The method according to claim 8, wherein the transcription film includes an adhesive layer on a side of the black resin layer facing the substrate for polarizing light.

11. The method according to the claim 1, further comprising forming an alignment layer on the common electrode.

12. A method of fabricating a color filter substrate for a liquid crystal display device, comprising steps of:

aligning a first transcription film having a black resin layer, a first light-to-heat conversion layer, and a first supporting film, sequentially onto a polarizing substrate;

selectively performing a first thermal transfer process on a first portion of the first transcription film;

removing the first transcription film except for the first portion where the first thermal transfer process is performed to form a black matrix on the polarizing substrate;

aligning a second transcription film having a color filter layer, a second light-to-heat conversion layer, and a second supporting film, sequentially onto the polarizing substrate including the black matrix;

selectively performing a second thermal transfer process on a first portion of the second transcription film;

removing the second transcription film except for the first portion of the second transcription film where the second thermal transfer process is performed to form a color filter on the polarizing substrate including the black matrix; and forming a common electrode on the color filter.

13. The method according to claim 1, wherein the substrate for polarizing light functions as a polarizer.

14. The method according to claim 1, wherein the substrate for polarizing light includes a plastic material.

* * * * *